(12) United States Patent
Cavendish et al.

(10) Patent No.: US 9,069,242 B2
(45) Date of Patent: Jun. 30, 2015

(54) THREE-DIMENSIONAL DISPLAY AND METHOD OF INSTALLING A THREE-DIMENSIONAL DISPLAY

(75) Inventors: William George Grey Cavendish, Edinburgh (GB); Oliver Roland Collier, Richmond (GB); Andrew Charles Crofts, Edinburgh (GB); Alan Miller Suttie, Glasgow (GB); Alex Graham Mitchell, Glasgow (GB)

(73) Assignee: PUFFERFISH LIMITED, Edinburgh (GB)

( * ) Notice: Subject to any disclaimer, the term of this patent is extended or adjusted under 35 U.S.C. 154(b) by 404 days.

(21) Appl. No.: 13/377,775

(22) PCT Filed: Jun. 11, 2009

(86) PCT No.: PCT/GB2009/050664
§ 371 (c)(1),
(2), (4) Date: Mar. 7, 2012

(87) PCT Pub. No.: WO2010/142933
PCT Pub. Date: Dec. 16, 2010

(65) Prior Publication Data
US 2012/0169999 A1    Jul. 5, 2012

(51) Int. Cl.
| | | |
|---|---|---|
| *G03B 21/14* | (2006.01) | |
| *G03B 21/585* | (2014.01) | |
| *G03B 21/58* | (2014.01) | |
| *G09F 19/18* | (2006.01) | |
| *G03B 21/62* | (2014.01) | |

(52) U.S. Cl.
CPC ......... *G03B 21/585* (2013.01); *Y10T 29/49002* (2015.01); *G03B 21/58* (2013.01); *G09F 19/18* (2013.01); *G03B 21/62* (2013.01)

(58) Field of Classification Search
CPC ................................ G03B 21/58; G09F 19/18
USPC .................... 353/7, 74, 75, 79, 97, 119, 122; 348/743–747; 446/175, 220, 226; 359/443, 450–451, 460–461
See application file for complete search history.

(56) References Cited

U.S. PATENT DOCUMENTS

| 4,597,633 A | 7/1986 | Fussell | |
|---|---|---|---|
| 5,724,775 A * | 3/1998 | Zobel et al. ....................... | 52/82 |

(Continued)

FOREIGN PATENT DOCUMENTS

| JP | 2008-076916 | 4/2008 |
|---|---|---|
| WO | WO 2008/065400 | 6/2008 |

OTHER PUBLICATIONS

International Search Report for PCT/GB2009/050664 mailed Jun. 15, 2010.

*Primary Examiner* — Sultan Chowdhury
(74) *Attorney, Agent, or Firm* — Nixon & Vanderhye PC (57) ABSTRACT

A method of assembling a three-dimensional display apparatus involves providing a support unit, made up of a projector mounting and a screen mounting surface having a first aperture therethrough; and a screen unit, made up of a diaphragm and an inflatable screen affixed thereto-the diaphragm defining a second aperture in communication with the inflatable screen. The screen mounting surface and the diaphragm are brought into contact so as to align the first and second apertures; and to secure the support unit to the screen unit to thereby create a seal between the support surface and the diaphragm around the first and second apertures. The seal being sufficiently gas tight to enable inflation of the screen.

19 Claims, 8 Drawing Sheets

(56) References Cited

U.S. PATENT DOCUMENTS

| | | | |
|---|---|---|---|
| 6,361,188 B1 * | 3/2002 | Kuts | 362/259 |
| 6,698,900 B1 | 3/2004 | Young et al. | |
| 7,311,580 B2 * | 12/2007 | Moomaw | 446/179 |
| 2002/0005997 A1 | 1/2002 | Oba et al. | |
| 2002/0163720 A1 * | 11/2002 | Piepel et al. | 359/443 |
| 2002/0171927 A1 * | 11/2002 | Barnes, III | 359/451 |
| 2005/0017924 A1 | 1/2005 | Utt et al. | |
| 2006/0111012 A1 * | 5/2006 | Machala | 446/226 |

* cited by examiner

Figure 10

THREE-DIMENSIONAL DISPLAY AND METHOD OF INSTALLING A THREE-DIMENSIONAL DISPLAY

This application is the U.S. national phase of International Application No. PCT/GB2009/050664 filed 11 Jun. 2009 which designated the U.S., the entire contents of each of which are hereby incorporated by reference.

FIELD OF THE INVENTION

The invention relates to the field of three-dimensional display apparatus.

BACKGROUND TO THE INVENTION

Three-dimensional displays, which display moving or static images over the surface of a three-dimensional geometric form, have an inherent advantage over flat, planar displays in that they may be viewed from more than one vantage point at any one time, allowing a dispersed audience to view images without the requirement for the display to have a predetermined orientation relative to said audience. Three-dimensional displays are typically spherical or spheroidal in form, but other three-dimensional geometric forms (e.g. cylindrical) are also known.

Such three-dimensional displays are typically installed at a site for a relatively short period, and are therefore required to be assembled and disassembled on a regular basis. In addition, three-dimensional displays are typically required to be transported to a site for assembly and use and/or stored in a disassembled form.

Known three-dimensional displays, such as the display disclosed in U.S. Pat. No. 4,597,633 (Fussel) require installation by experienced technicians, in order to ensure that the screen is secured to the display apparatus correctly, that gas-retaining seals are established around the mouth of the screen and image projecting apparatus extending into the interior of the screen, and to ensure that the relative position of the screen with respect to the image projection apparatus is correct.

The high performance display disclosed in WO 2008/065400 (Pufferfish Limited) requires precise alignment of the screen with image projection apparatus in order to prevent undesirable distortion of images projected on the screen. This cannot be achieved if the screen is incorrectly installed and this problem is mitigated by keeping the three-dimensional screen remains attached to the base unit for storage or transport. Whilst this solution ensures that the display apparatus can be reliably installed, the storage and transport solution may be insufficiently compact for some applications, for example transport by air or transport of particularly large three-dimensional display apparatus and in some circumstances it is therefore necessary to disassemble three-dimensional display apparatus of the type disclosed in WO 2008/065400.

Thus, there remains a need for three-dimensional display apparatus which may be conveniently shipped and/or stored in a configuration which is suitable to be assembled rapidly and reliably without the requirement for particular technical familiarity with three-dimensional displays.

Furthermore, there remains a need for three-dimensional display apparatus suitable to be broken down into small units for storage or transport.

SUMMARY OF THE INVENTION

According to a first aspect of the present invention there is provided a method of assembling three-dimensional display apparatus, comprising the steps of:

providing a support unit comprising a projector mounting and a screen mounting surface with a first aperture therethrough;

providing a screen unit, the screen unit comprising a diaphragm and an inflatable screen affixed thereto, the diaphragm defining a second aperture in communication with the interior of the inflatable screen;

bringing the screen mounting surface and the diaphragm into contact so as to align the first aperture with the second aperture; and securing the support unit to the screen unit to thereby create a seal between the support surface and the diaphragm around the first and second apertures, wherein the seal is sufficiently gas tight to enable inflation of the screen.

According to a second aspect of the present invention there is provided three-dimensional display apparatus, comprising:

a support unit comprising a projector mounting and a screen mounting surface with a first aperture therethrough, a screen unit comprising a diaphragm and an inflatable screen affixed to the diaphragm, the diaphragm defining a second aperture in communication with the interior of the inflatable screen;

wherein the support unit is releasably secured to the screen unit such that the first and second apertures are aligned and the support surface and the diaphragm are sealed together around the first and second apertures, and the seal is sufficiently gas tight to enable inflation of the screen.

Three-dimensional display apparatus comprising an inflatable screen requires at least one aperture in communication with the interior of the screen, in order to provide access to equipment such as inflation equipment, projection equipment and so forth. It is therefore necessary to provide a gas-tight seal around any equipment extending to, or through the or each aperture. Establishing a seal which is sufficiently gas tight to enable the screen to be inflated is typically a time consuming process.

Assembly of three-dimensional display apparatus, from two units, formed and arranged so as to enable a seal to be formed around equipment extending to, or through the aperture in communication with the interior of the screen that is sufficiently gas tight to enable inflation of the screen, by the act of joining the two units together, therefore enables rapid and reliable assembly of the apparatus.

For example, known three-dimensional display apparatus comprising an inflatable screen may take between several hours and several days to assemble at a site, whereas assembly of three-dimensional display apparatus of the present invention can typically be completed in under an hour.

Preferably the method comprises the step of providing projection apparatus (such as a projector, or a laser) mounted to the projector mounting, and the apparatus comprises projection apparatus mounted to the projector mounting.

In some embodiments the method comprises the steps of:
providing a first support sub-unit comprising a screen mounting surface and an image guiding assembly extending through a first aperture in the screen mounting surface;

providing a second support sub-unit comprising a projector mounting;

demountably securing the first support sub-unit to the second support sub-unit and thereby providing a support unit;

securing the support unit to the screen unit to thereby create a seal between the support surface and the diaphragm around the first and second apertures, wherein the seal is sufficiently gas tight to enable inflation of the screen.

In some embodiments the apparatus accordingly comprises a support unit comprising a projector mounting and a screen mounting surface with a first aperture therethrough, a screen unit comprising a diaphragm and an inflatable screen affixed to the diaphragm, the diaphragm defining a second aperture in communication with the interior of the inflatable screen;

wherein the support unit is releasably secured to the screen unit such that the first and second apertures are aligned and the support surface and the diaphragm are sealed together around the first and second apertures, and the seal is sufficiently gas tight to enable inflation of the screen.

In some embodiments, the projection apparatus further comprises an image guiding assembly extending through the first aperture in the screen mounting surface, and the method comprises the steps of;

bringing the screen support surface and the diaphragm into contact so as to align the first aperture with the second aperture, so that the image guiding assembly extends through the first and second apertures;

securing the support unit to the screen unit to thereby create a seal between the support surface and the diaphragm around the first and second apertures, wherein the seal is sufficiently gas tight to enable inflation of the screen.

The image guiding apparatus may be a lens assembly, comprising a lens (for example a fisheye lens). In some embodiments, the image guiding apparatus comprises a laser. In some embodiments the image guiding apparatus comprises reflectors, for reflecting projected light on to the surface of the screen.

Three dimensional display apparatus typically requires an image to be displayed on the three-dimensional screen. Image guiding apparatus is therefore required to be operable to provide an image across the entire, or a substantial portion of, the surface of the screen without undesirable distortions. As a consequence, it is known for precise alignment of the position of image guiding apparatus, for example a fisheye lens, to be required.

Precise alignment of the position of image guiding apparatus of three-dimensional display apparatus is typically a time consuming task and may require training and experience. The method and apparatus of the present invention advantageously ensures that the relative positions of the image guiding apparatus and the screen are predefined, such that time consuming realignment is not required. Furthermore, the apparatus may be repeatedly disassembled, stored or transported and rapidly reassembled without the requirement for realignment of the image guiding apparatus.

Preferably, the method comprises the steps of passing an image guiding assembly through the first aperture and securing the image guiding assembly to the support unit.

Preferably, the image guiding assembly comprises a flexible collar having dimensions which exceed the dimensions of the first aperture and the second aperture, and the method comprises the steps of:

bringing the screen mounting surface and the diaphragm into contact so as to align the first aperture with the second aperture, so that the image guiding assembly extends through the first and second apertures and the flexible collar extends between the screen mounting surface and the diaphragm; and securing the screen mounting surface to the diaphragm to thereby create a seal between the support unit and the screen unit, wherein the seal is sufficiently gas tight to enable inflation of the screen when the blower is activated.

In some embodiments, the flexible collar is provided with magnets and at least some of the screen mounting surface is composed of a ferrous material, and the method comprises the step of bringing the magnets into magnetic contact with the screen mounting surface and thereby securing the flexible collar to the screen mounting surface.

In some embodiments, the method comprises the further step of providing a blower affixed to the support unit, the blower having an exhaust conduit extending to a third aperture in the diaphragm, and the apparatus comprises a blower having an exhaust conduit extending to a third aperture in the diaphragm.

Preferably the method comprises the step of inflating the screen by activating the blower.

The invention extends in a third aspect to a case for a support unit of three-dimensional display apparatus according the second aspect, the support unit case comprising a lid comprising a demountable lid adapted to support the case, and a demountable base section adapted to support the case.

Preferably, the case further comprises one or more side sections, wherein the lid is releasably secured to one or more side sections, the one or more side sections are releasably secured to the base section.

The invention also extends to a case adapted to retain a support unit of a three-dimensional display apparatus, the case comprising a demountable lid adapted to support the case, and a demountable base section adapted to support the case; such that the lid is removable while the case is resting on the base section to enable the support unit to be removed from the case or a screen unit to be mounted to a screen mounting surface of the support unit; and the base section is removable while the case is resting on the lid to enable the support unit to be removed from the case.

Typically, the case is a case for a support unit of a three-dimensional display apparatus which has a projector mounting and a screen mounting surface.

In some embodiments, the case further comprises one or more side sections, wherein the lid is releasably secured to the one or more side sections and the one or more side sections are releasably secured to the base section.

Optionally, the lid and at least one of the one or more side sections are removable while the case is resting on the base section to enable the support unit to be removed from the case or a screen unit to be mounted to the screen mounting surface of the support unit; and the base section and at least one of the one or more side sections are removable while the case is resting on the lid to enable the support unit to be removed from the case.

The lid section and the base section may be adapted so as to have sufficient mechanical strength to support the case, while it contains a said support unit, and thereby be adapted to support the case. Preferably, the base section and/or the lid comprises wheels to support the case and facilitate movement of the case. Alternatively, or in addition, the base section and/or the lid comprises a plurality of skids to support the case and facilitate movement of the case.

For example, the base section may comprise wheels (for example casters) and the lid may comprise a plurality of skids. Alternatively, the base section and the lid may comprise a plurality of skids and/or wheels, such as recessed wheels, or casters.

The invention extends in a fourth aspect to a case for a screen unit of three-dimensional display apparatus according to the second aspect, wherein the screen unit case is adapted to support the diaphragm of a screen unit, and enclose an inflatable screen of a screen unit extending from the diaphragm into the case.

Accordingly, the method may comprise the steps of:
providing a screen unit case adapted to enclose the screen unit and support the diaphragm of a screen unit; and
providing a screen unit enclosed within the screen unit case and supported by the diaphragm, such that the inflatable screen extends from the diaphragm within the case.

In some embodiments, the method comprises the steps of positioning the screen unit case adjacent to the support unit, inverting the diaphragm and placing it on the support unit, so as to bring the screen mounting surface and the diaphragm into contact.

Preferably the method comprises the step of removing the lid and, in some embodiments, the one or more side sections from the base section of the screen unit case to expose the support unit, and to thereby provide a support unit, the support unit supported on the base section.

Optionally, the method comprises the step of separating the support unit from the base section, to thereby provide a support unit.

In some embodiments, the method comprises the steps of:
providing an inverted the support unit;
lifting the inverted support unit;
positioning the support unit and the screen unit case so that the support unit is above the screen unit supported in the screen unit case; and
bringing the screen mounting surface and the diaphragm into contact by lowering the support unit onto the screen unit.

In some embodiments, the method comprises the steps of:
inverting the support unit;
lifting the inverted support unit
positioning the support unit and the screen unit case so that the support unit is above the screen unit supported in the screen unit case; and
bringing the screen mounting surface and the diaphragm into contact by lifting the screen unit by diaphragm until it meets the support unit.

Preferably, the method comprises the steps of:
inverting the support unit case so that it rests upon the lid;
removing the base section; and
lifting the inverted support unit.

By inverted support unit we mean a support unit in an orientation suitable to be attached to a screen unit such that the screen unit is below the support unit.

Optionally, the method comprises the steps of removing the one or more side sections and lifting the inverted support unit.

Thus the three-dimensional display apparatus of the invention is deployable directly from a screen unit case and/or a support unit case. The cases therefore provide a convenient means of transporting the display apparatus, and the invention enables rapid and reliable on-site installation.

According to a fifth aspect of the present invention there is coupling for securing the mouth of an inflatable three-dimensional screen, comprising a first circumferential member, a second circumferential member, and a plurality of fixings for securing the first circumferential member to the second circumferential member;
the first circumferential member comprising a first gasket surface, having an indentation extending around the gasket surface;
the second circumferential member comprising a second gasket surface which opposes the first gasket surface; and
a circumferential retainer which cooperates with the indentation when the first circumferential member is secured to the circumferential member such that, in use, the mouth of an inflatable three-dimensional screen is positioned between the first gasket surface and the second gasket surface and secured within the indentation by the circumferential retainer.

Accordingly, the invention also extends to three-dimensional display apparatus comprising:
a support unit comprising a projector mounting and a screen mounting surface; and
a screen unit comprising a diaphragm, an inflatable screen affixed to the diaphragm, a first circumferential member positioned at the mouth of the screen, the diaphragm comprising a second circumferential member;
wherein the support unit is releasably secured to the screen unit; and
wherein the mouth of the screen is affixed to the diaphragm by a coupling comprising the first circumferential member, the second circumferential member, and a plurality of fixings for securing the first circumferential member to the second circumferential member;
the first circumferential member comprising a first gasket surface, having an indentation extending around the gasket surface;
the second circumferential member comprising a second gasket surface which opposes the first gasket surface; and
a circumferential retainer which cooperates with the indentation when the first circumferential member is secured to the circumferential member such that the mouth of an inflatable three-dimensional screen is positioned between the first gasket surface and the second gasket surface and secured within the indentation by the circumferential retainer.

Inflatable three-dimensional screens are required to be secured to three-dimensional display apparatus in such a way as to provide a seal which is sufficiently gas tight to enable inflation of the screen, and in a manner which is sufficiently robust to withstand mechanical stress placed on the screen, in use, for example wind (for outdoor installations), stresses caused during installation, tension around the mouth of the screen due to the gas pressure required to inflate the screen, or the weight of the screen, for example if the screen is suspended at an angle, or upside down. The coupling between an inflatable screen and other apparatus is therefore a critical aspect of three-dimensional display apparatus. The process of securing the inflatable screens of known three-dimensional display apparatus is typically time consuming and, due to the inherent complexity of the process, failure of the coupling between the screen and the display apparatus is a known problem.

In addition, known couplings comprise pins or bolts which extend through apertures in the material of the mouth of the screen, and require that mechanical stresses placed upon the screen be transmitted through the pins or bolts. Therefore, the stresses must be borne by the material of the mouth of known inflatable screens in the region of the apertures, and failure of known screens in these regions is a known problem which typically limits their functional lifetime.

Advantageously, the coupling of the present invention distributes the mechanical stresses placed on the screen evenly around the entire circumference of the mouth of the screen, thereby extending the lifetime of the screen. In addition, the coupling is adapted to be permanently secured to a diaphragm of three-dimensional display apparatus and therefore the time consuming and unreliable steps of installation of the inflatable three-dimensional screen are avoided. The coupling therefore provides a three-dimensional screen having a longer lifetime, which is more mechanically robust in use, and which may be installed more rapidly and reliably.

Preferably, the circumferential retainer is a resilient O-ring or cord.

In some embodiments, the circumferential retainer, which may be a resilient circumferential retainer, is a circumferential ridge extending from the second gasket surface.

According to a sixth aspect of the present invention there is provided a coupling for securing the mouth of an inflatable three-dimensional screen, comprising a first circumferential member, a second circumferential member, and a plurality of fixings for securing the first circumferential member to the second circumferential member;

the first circumferential member comprising a first gasket surface, having a first circumferential surface feature;

the second circumferential member comprising a second gasket surface which opposes the first gasket surface, and a second circumferential surface feature which cooperates with the first circumferential surface feature such that, in use, the mouth of an inflatable three-dimensional screen is positioned between the first gasket surface and the second gasket surface and secured between the cooperating first and second circumferential surface features.

Preferably the first surface feature or the second surface feature is an indentation and the other of the first surface feature and the second surface feature is a ridge. In some embodiments, the first or second gasket surface comprises a step and an inwardly facing lip which functions as a circumferential surface feature, and other of the first or second gasket surface comprises a step and an outwardly facing lip which functions as a circumferential surface feature.

Optionally, the first circumferential surface feature and/or the second circumferential surface feature is resilient.

The or each of the said fixings may be any suitable fixing, and for example may be selected from the group: a swell latch, a threaded fastener, a clamp.

Preferably, the three-dimensional display apparatus comprises:
a support unit comprising a projector mounting and a screen mounting surface; and
a screen unit comprising a diaphragm, an inflatable screen affixed to the diaphragm, a first circumferential member positioned at the mouth of the screen, the diaphragm comprising a second circumferential member;
wherein the support unit is releasably secured to the screen unit; and
wherein the mouth of the screen is affixed to the diaphragm by a coupling according to the fifth, or the sixth, aspect.

According to a seventh aspect of the present invention, there is provided a demountable image guiding assembly for use with three-dimensional display apparatus according to the second aspect, comprising an image guide apparatus, a body and a flexible collar extending around the body.

Preferably the image guide apparatus is a lens.

Preferably the flexible collar comprises one or more magnets.

A flexible collar having one or more magnets may be releasably secured to a ferrous material, such as the region of a screen mounting surface around an aperture therethrough, in order to hold the flexible collar in the correct position to receive a screen unit, regardless of the orientation of the flexible collar.

According to an eighth aspect of the present invention there is provided a three-dimensional display apparatus, comprising:
a support unit comprising a projector mounting and a screen mounting surface;
a screen unit comprising a screen support and an three-dimensional screen affixed thereto, the screen support defining an aperture in communication with the interior of the screen, and wherein the screen support suitable to support the screen in any orientation; and
wherein the support unit is releasably secured to the screen unit.

Preferably, the support unit comprises an image guiding assembly and the support unit is releasably secured to the screen unit in a position such that the image guiding assembly is aligned with the three-dimensional screen.

The invention also extends to a method of assembling three-dimensional display apparatus, comprising the steps of:
providing a support unit comprising a projector mounting and a screen mounting surface;
providing a screen unit, the screen unit comprising a screen support and a three-dimensional screen affixed thereto, the screen support defining an aperture in communication with the interior of the screen, and suitable to support the screen in any orientation; and
securing the support unit to the screen unit.

Preferably the apparatus comprises projection apparatus mounted to the projector mounting, wherein the projection apparatus further comprises an image guiding assembly, and the method comprises the step of;
securing the support unit to the screen unit to thereby provide three-dimensional display apparatus wherein the image guiding assembly is aligned with three-dimensional screen.

According to a ninth aspect of the present invention there is provided a kit of parts comprising:
a case adapted to retain a support unit of a three-dimensional display, having a lid releasably secured to one or more side sections and adapted to support the case, and a base section adapted to support the case, the one or more side sections being releasably secured to the base section; and
a support unit for a three-dimensional display apparatus, having a projector mounting and a screen supporting surface.

Preferably, the kit further comprises:
a screen unit of a three-dimensional display comprising an inflatable screen and a diaphragm assembly, the diaphragm assembly adapted to be releasably secured to the support unit; and
a case adapted to retain a screen unit of a three-dimensional display and adapted to support the diaphragm of the screen unit, and enclose the inflatable screen extending from the diaphragm into the case.

By "inflatable" we mean that the three dimensional screen can be inflated by filling it with pressurised or hot air. The three dimensional screen may be elastic or inelastic, although typically it will be relatively inelastic. The three dimensional screen may be gas-tight, although a three dimensional screen is typically employed which is not entirely gas-tight but allows the slow egress of gas, but which retains gas sufficiently to be inflatable. Where the projection screen is not entirely gas-tight, gas will typically be supplied into the three-dimensional space defined by the inflatable projection screen continuously, for example from a blower.

The three-dimensional display apparatus may be used to display static images. Typically, the images will be moving images (i.e. video) and the three-dimensional display apparatus will be adapted to display moving images.

The three-dimensional screen, which may be an inflatable three-dimensional screen is typically translucent in order that the image guiding assembly (for example a lens assembly) may project images onto the inner surface of the inflatable three-dimensional screen which are visible on and viewed from the outside of the three-dimensional display apparatus. Suitable flexible rear projection screen materials are known to those skilled in the art. However, the three-dimensional display apparatus may be adapted for the viewing of images within the three-dimensional screen screen, in which case the three-dimensional screen may be opaque.

Preferably, the three-dimensional display apparatus is configured to project images directly onto the inner surface of the three-dimensional screen in use, for example when the inflatable three-dimensional screen is inflated. This configuration can help maximise the surface area over which images are displayed and avoids shadows. However, the three-dimensional display apparatus may be configured to project images onto optical components (such as mirrors, lenses etc.) which direct projected images onto the inner surface of the three-dimensional screen.

The three-dimensional screen may comprise two layers. The inner layer may be transparent. The outer layer may be translucent (e.g. for the display of images to be viewed from the outside of the display) or opaque (e.g. for the display of images to be viewed from the inside of the display). It may be that the inner layer is translucent and the outer layer is transparent or translucent (e.g. for the display of images to be viewed from the outside of the display).

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
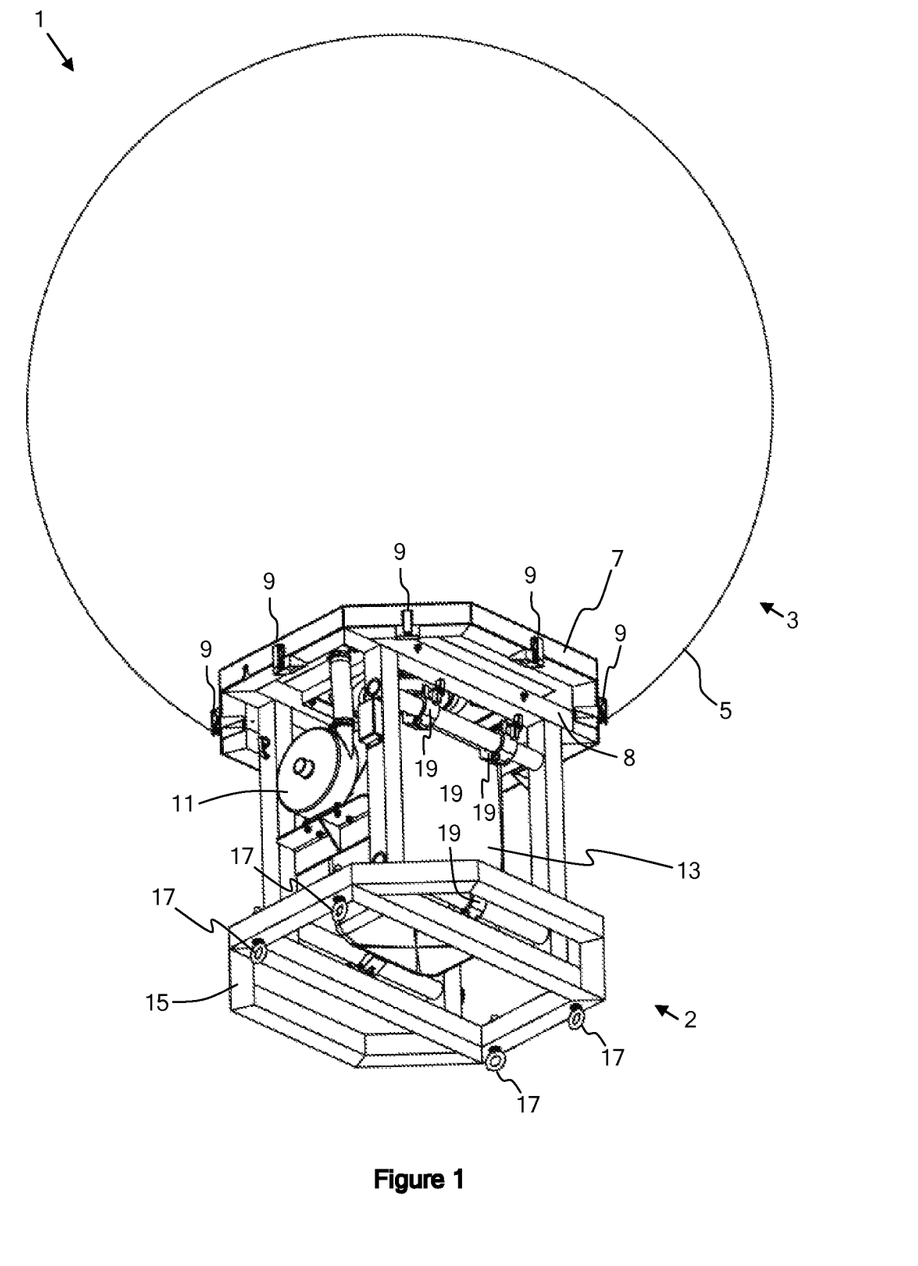
FIG. 1 is a perspective view of three-dimensional display apparatus.

FIG. 1 is a perspective view of three-dimensional display apparatus 1, comprising a support unit 2 and a screen unit 3. The screen unit comprises an inflatable screen 5 (shown as inflated) composed of resilient PVC material and a diaphragm assembly 7 releasably fixed to the screen mounting surface 8 of the support unit by draw latches 9.

The support unit has a metal framework construction, enclosing a blower 11 and a projector 13. Affixed to the bottom surface 15 are eyelets 17.

Figure 2A:
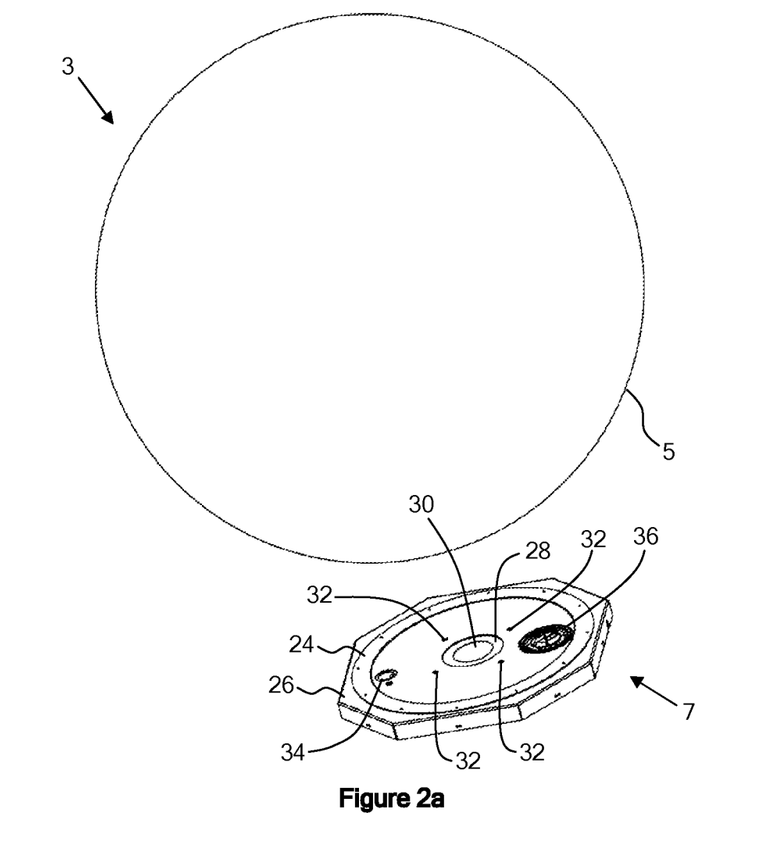
FIG. 2a is an exploded perspective view of a screen unit.
Figure 2B:
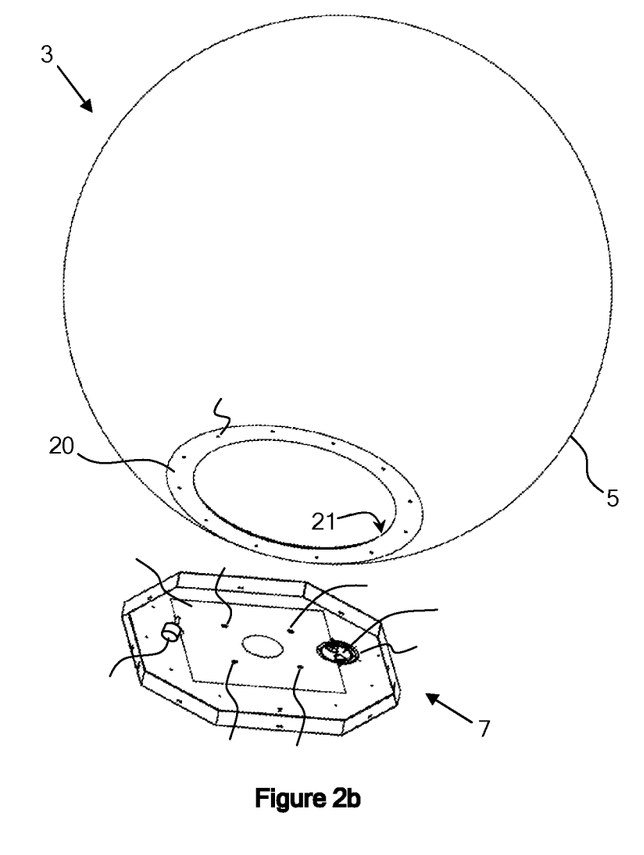
FIG. 2b is an alternative exploded perspective view of a screen unit.

FIGS. 2a and 2b show exploded perspective views of the screen unit in more detail. The mouth 20 of the screen is supported by sealing ring 21, which is positioned within the screen and discussed in further detail below. Disposed around the sealing ring, and passing through locating holes 40 around the mouth of the screen are bolts 22, which correspond to bolt holes 23 disposed around ring gasket 24 on the upper surface of the frame 26 of the diaphragm assembly.

The diaphragm assembly comprises a metal frame 26, and a diaphragm seal 28 composed of a rubber material. Latch holes 32 pass through the metal frame and the diaphragm seal.

The metal frame defines blower port 34, and access port 36 which threadably retains access hatch 37. The metal frame and the diaphragm seal together define lens port 30. Ducting connector 35, which is aligned with the blower port, extends from the underside of the metal frame.

Figure 3A:
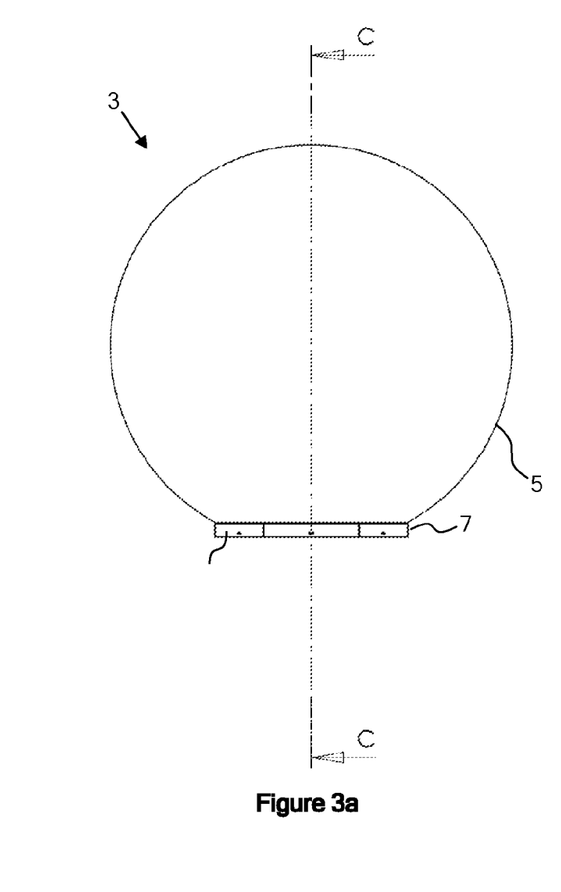
FIG. 3a is a side view of a screen unit.

When assembled, as shown in FIG. 3a, bolts 22 extend through bolt holes is the 23 and the diaphragm assembly is secured to the sealing ring by threaded fasteners 38 and the mouth of the screen is thus sandwiched between the ring gasket and the sealing ring.

Figure 3B:
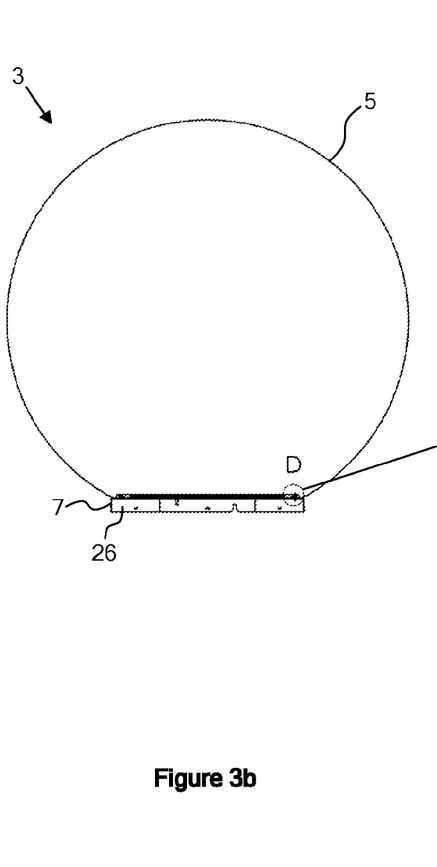
FIG. 3b is a cross sectional view of a screen unit.
Figure 3C:
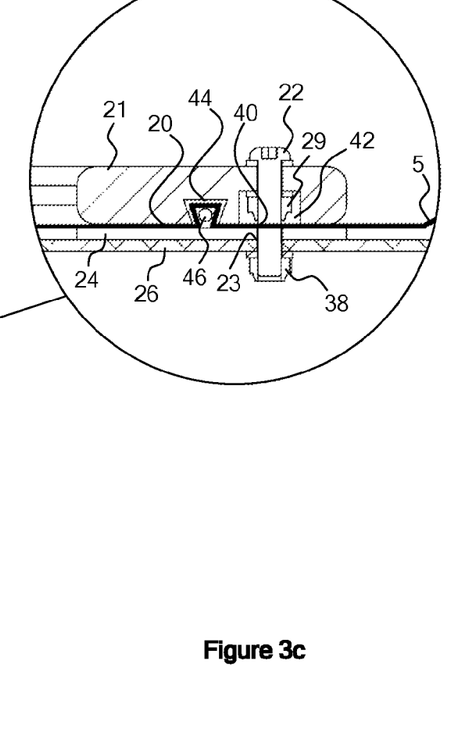
FIG. 3c is a detail cross sectional view of a region of a screen unit.

FIG. 3b shows a cross sectional view of the screen unit, along C, and FIG. 3b shows a detailed cross sectional view of region D.

Bolts 22 are secured to sealing ring 21 by nuts 39 located in cylindrical recesses 42, and pass through bolt holes 23 in ring gasket 24 and frame 26. The sealing ring, ring gasket and frame are secured together by threaded fasteners 38, thereby trapping the mouth 20 of the screen between the sealing ring and the ring gasket.

In alternative embodiments, the threaded fasteners 38 are wing nuts, or the sealing ring, ring gasket and frame are secured together by swell latches or swell bolts.

A trapezoidal channel 44 extends around the surface of the sealing ring adjacent to the ring gasket. O-ring 46, which functions as a circumferential retainer, is located within the trapezoidal channel and a portion of the screen extends around the O-ring. The O-ring and the thickness of the screen material either the O-ring has a diameter slightly greater than the width of the open end of the trapezoidal channel.

Figure 4:
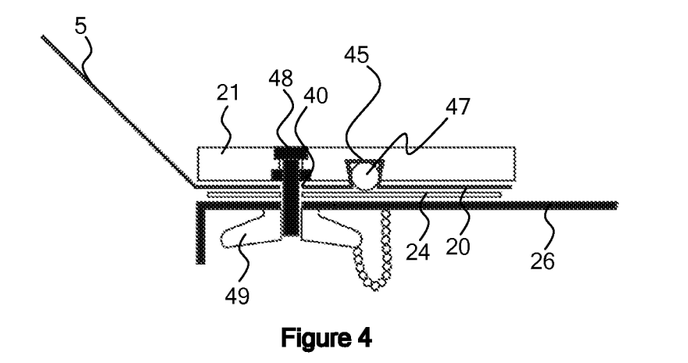
FIG. 4 is a detail view of an alternative embodiment of a region of a screen unit.

An alternative embodiment of D is shown in FIG. 4. The side walls of the trapezoidal channel 45 are closer to perpendicular to the surface of the ring gasket than corresponding features of the embodiment shown in FIG. 3c, and in alternative embodiments of the circumferential indentation, or circumferential surface feature need not be trapezoidal. Resilient cord 47 (typically composes of a nitrile material), which functions as a circumferential retainer, has a diameter slightly greater than the depth of the trapezoidal channel. The sealing ring, ring gasket and the frame are secured together by swell bolts 48 and wingnuts 49. The resilient cord is therefore compressed and the compressive force is exerted on the Material from the mouth of the screen within the trapezoidal channel.

Retention of the screen within the trapezoidal channel, as shown in FIGS. 3c and 4, ensures that when the screen is inflated, in use, tension is distributed evenly around the circumference of trapezoidal channel and is not focused in the region of the locating holes 40. This arrangement and therefore renders it the screen more resistant to damage and wear around the mouth of the screen he region of the attachment to the diaphragm assembly. This both extends the lifetime of the screen, and enables the screen to withstand higher internal air pressure when inflated, in use.

Furthermore, the arrangement is sufficiently robust that the screen may be permanently attached to the diaphragm assembly.

In alternative embodiments, the plurality of fixings (such as wingnuts or threaded fasteners) for securing the diaphragm assembly to the sealing ring, are positioned within the circumference of the circumferential surface feature, such that there are no apertures in screen material further from the mouth of the screen than the seal between the diaphragm assembly and the sealing ring. This arrangement may be advantageous in some applications, for example where a constant supply of air is not available and a regulated leakage of air from the screen is not required.

Figure 5:
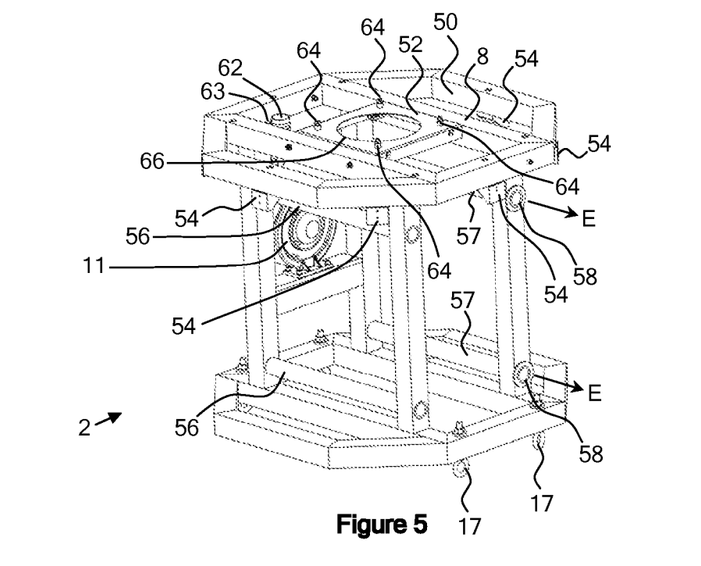
FIG. 5 is a perspective view of a support unit.

FIG. 5 is a perspective view of support unit 2, shown without the projector installed. Screen mounting surface 8 is defined by screen mounting frame 50 and lens plate 52. Draw latch keepers 54, disposed around the periphery of the screen mounting frame, are positioned to engage with the draw latches 9 of the diaphragm assembly. In use, the projector is secured between cross members 56 and removable cross members 57 by clamps 19 (visible in FIG. 1). The removable cross members may be slideably removed in the direction E. When the flanges 58 abut strut 59, the threaded end of each removable cross member (not shown) extends through strut 60 and swell latches (not shown) may be deployed to secure the removable cross members to the support unit. The cross members and removable cross members function as a projector mounting.

Duct 62, comprising a resilient material, extends from the blower to the screen to the mounting surface and is positioned to slide over the ducting connector 35, when the screen unit is installed on the support unit. Swell latches 64 are positioned on the lens plate to align with, and thus extend through, latch holes 32, when the screen unit is installed on the support unit. The lens plate defines a lens opening 66 (i.e., an aperture) positioned to align with the lens port (i.e., an aperture), when the screen unit is installed on the support unit.

Figure 6:
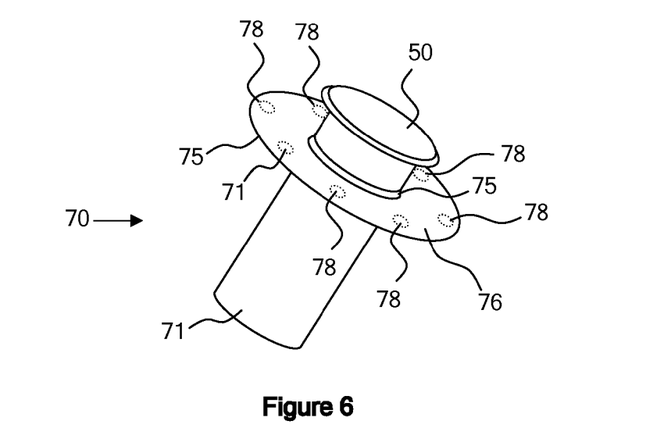
FIG. 6 is a perspective view of a lens unit.

FIG. 6 shows a lens unit 70 comprising a body 71 supporting a fisheye lens 72. Flexible collar 74, positioned around the body, composed of a resilient rubber material, comprises a neck portion 75 which extends around the body above and below and a disc portion 76. Magnets 78 are embedded around the periphery of the disc portion of the flexible collar. The lens unit is adapted to be secured to the projector.

Figure 7A:
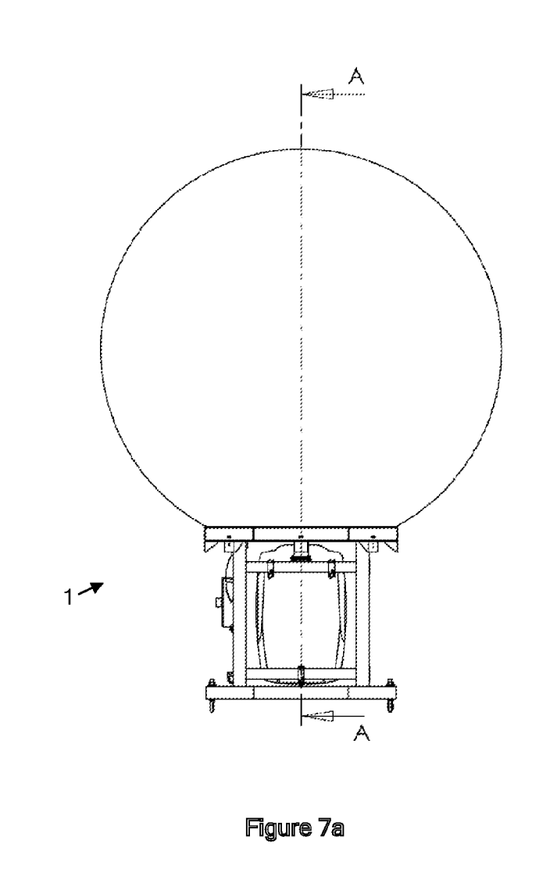
FIG. 7a is a side view of three-dimensional display apparatus.
Figure 7B:
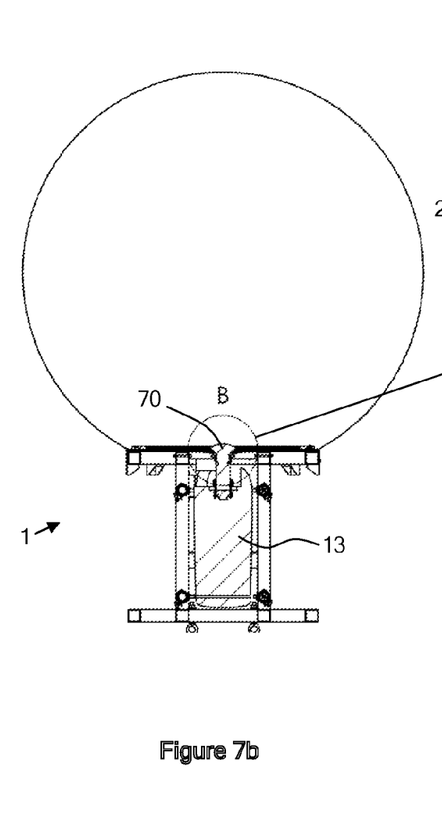
FIG. 7b is a cross sectional view of three-dimensional display apparatus.
Figure 7C:
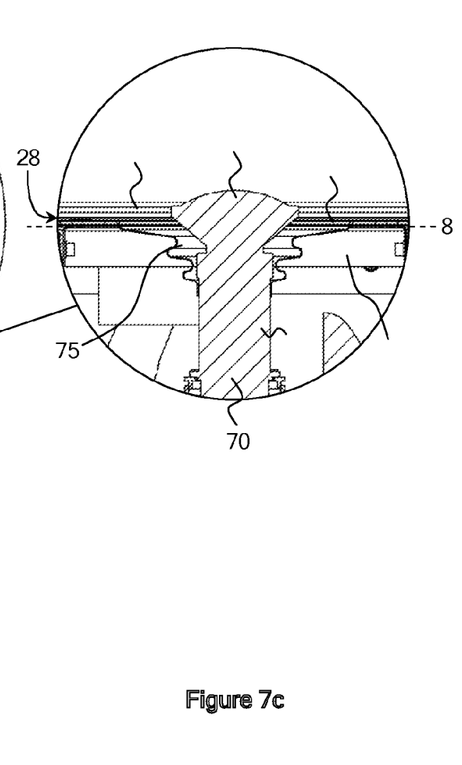
FIG. 7c is a detail cross sectional view of a region of a three-dimensional display apparatus.

FIG. 7a shows a side view of the display apparatus. FIG. 7b shows a cross sectional view of the display apparatus through A, showing the lens unit 70 secured to the projector 13. FIG. 7c shows a detailed view of B, showing the body of the lens assembly extending through the lens opening in the lens plate and the lens port, such that the fisheye lens projects beyond the metal frame of the diaphragm assembly into the interior of the screen.

The disc portion of the flexible collar is sandwiched between the lens plate and the diaphragm seal. The metal plate and the lens plate are held together in compression by the swell latches 64 (not shown in the FIG. 7c).

Figure 8A:
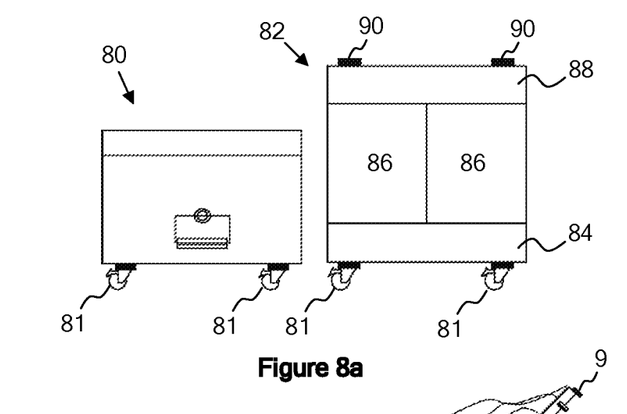
FIG. 8a is a side view of a screen unit case and a support unit case.

The three-dimensional display apparatus is adapted to the transported and deployed from flight cases. A screen unit case 80, supported by casters 81, is adapted to hold the screen unit. Support unit case 82 is adapted to hold the support unit. The support unit case comprises a base section 84, side sections 86, and lid 88. The base section is recently secured to the side sections, and the side sections are recently secured to each other and the lid, by latches (not shown). As for unit case is adapted to rest upright on casters, be inverted to rest on skids 90.

Figure 8B:
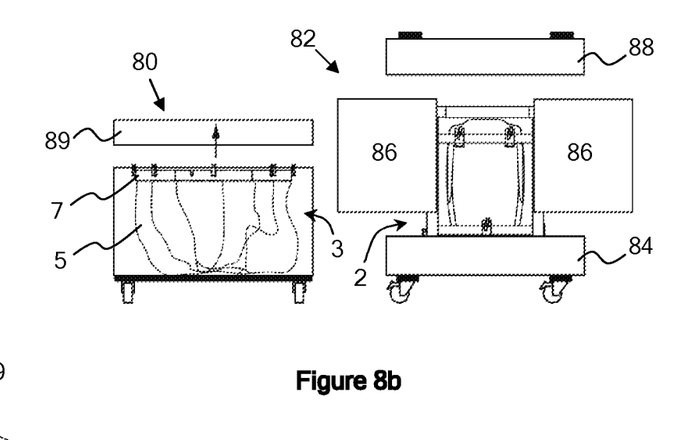
FIG. 8b is a schematic side view of a step of preparing the three-dimensional display apparatus for assembly in upright position.

As shown in FIG. 8b, the three-dimensional display apparatus is prepared for assembly in upright position by removing the lid and the side sections of the support unit case to expose the support unit. Optionally, the support unit can be lifted from the base section to rest on eyelets 17.

The lid 89 of the screen unit case, positioned adjacent to the support unit, must also be removed prior to assembly. The screen unit is supported within the screen unit case by the diaphragm assembly, such that the screen hangs from the diaphragm assembly within the screen unit case. Thus, the screen may remain permanently attached to the diaphragm assembly and may be stored and transported in such a way as to prevent tearing or creasing of the screen. In addition the three-dimensional display apparatus may be assembled without the requirement to secure the mouth of the screen to other apparatus.

The process of securing the mouth of the screen to the other apparatus, for known three-dimensional display apparatus, may be time-consuming. In addition, the mouth of the screen must be connected to other apparatus in such a way as to divide a seal between the screen and the said other apparatus which is sufficiently gas tight so as to enable the screen to be inflated. Furthermore, errors in this process, for example introducing creases, may impair the function of the three-dimensional display and/or result in damage to the screen. Therefore, obviation of the need to secure the mouth of the screen to other apparatus each time the three-dimensional display apparatus is assembled, as provided by the present invention, facilitates more rapid and reliable assembly.

Figure 8C:
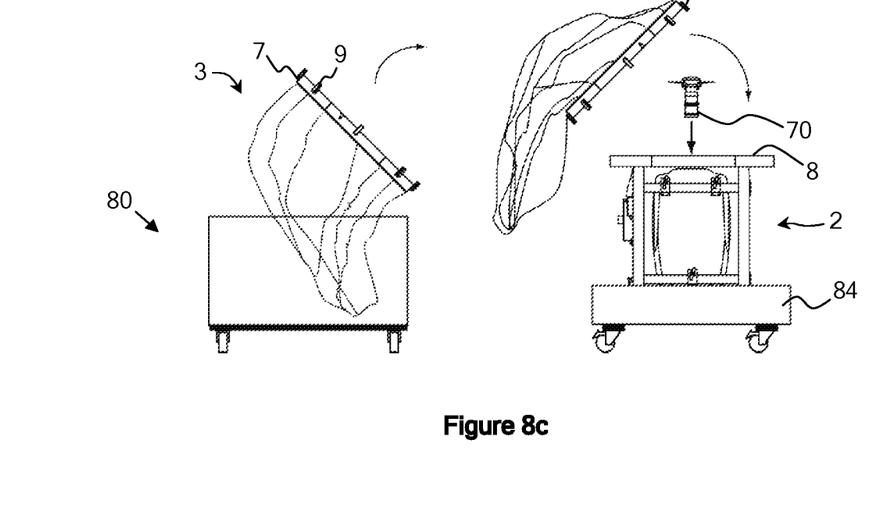
FIG. 8c is a schematic side view of a step of assembling three-dimensional display apparatus in an upright position.

As shown in FIG. 8c, the lens assembly is then lowered through the lens opening and secured to the projector. This flexible collar rests on the lens plate and is held in position by the magnets.

The screen unit may then be lifted by the diaphragm assembly, inverted, and placed on the screen mounting surface, and secured to the screen mounting frame by the draw latches oriented such that the ducting connector 35 is proximal to the duct 62.

The blower is then connected to the blower plot by sliding duct 62 over the ducting connector 35, type of 63 (which can be seen in FIG. 5).

Figure 8D:
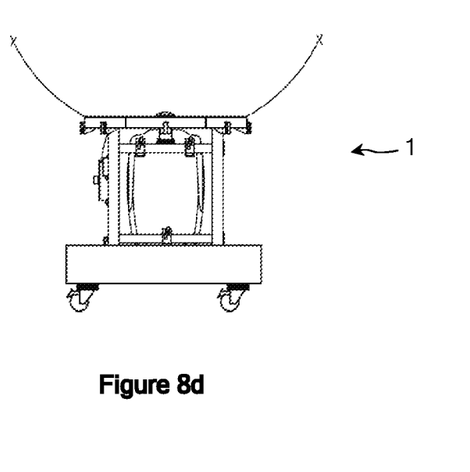
FIG. 8d is a schematic side view of three-dimensional display apparatus assembled in an upright position.

Compression latches 64 are then deployed in order to secure the metal plate to the lens plate under compression, and thereby create a seal around the lens assembly which is sufficiently gas tight to enable the screen to the inflated in the blower is activated, as shown in FIG. 8d.

Figure 9A:
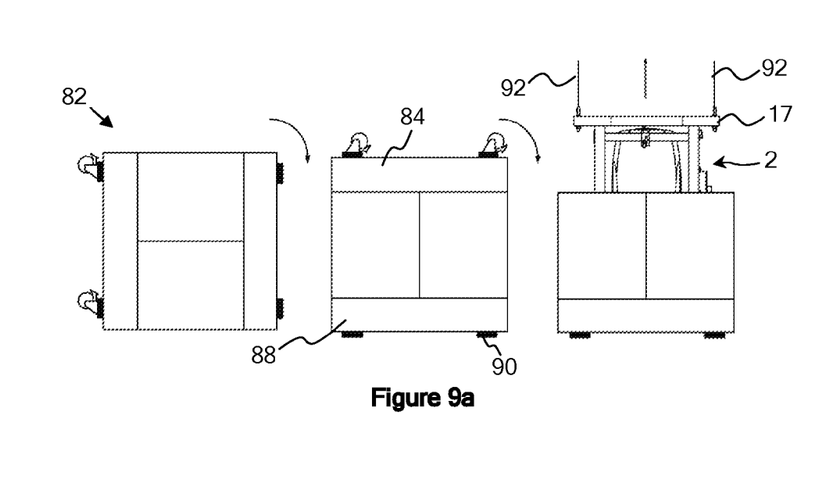
FIG. 9a is a schematic side view of a step of preparing the three-dimensional display apparatus for assembly in an inverted position.

Similarly, the three-dimensional display apparatus may be prepared for assembly in an inverted position by inverting the screen unit case sure which rests on skids 90 (FIG. 9a) and removing the base section 84. The eyelets 17 may then be secured to a hoist comprising cables 92 and the screen unit lifted from the screen unit case in the direction F.

Figure 9B:
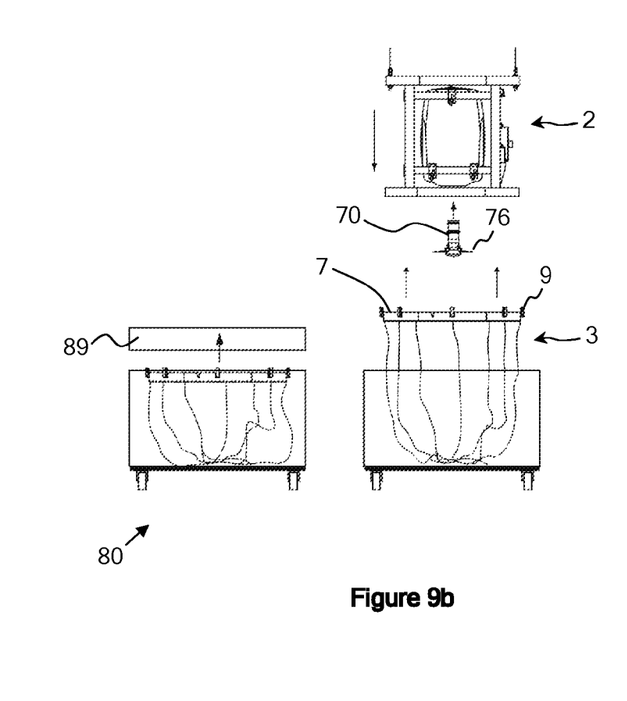
FIG. 9b is a schematic side view of a step of assembling three-dimensional display apparatus in an inverted position.

As shown in FIG. 9b, the leader 89 on the screen unit case may then be removed and the screen unit case positioned beneath the inverted support unit, oriented such that the lens port is aligned with the lens opening and the duct is approximately aligned with the ducting connector.

The lens assembly may then be introduced upwardly through the lens opening and secured to the projector. The disc portion of the flexible collar will typically hang down in a generally comical configuration. When the disc portion is into contact with the lens plate, it is secured in position, and prevented from hanging away from the lens plate, by the magnets 78.

The screen unit may then be lifted by the diaphragm assembly to contact the screen mounting surface, and secured to the support unit by the draw latches, in a similar manner to the procedure discussed above, in relation to FIG. 8c. Alternatively, the supposed unit may be lowered onto the screen unit.

The blower may be connected to the blower port, and a seal established around the lens assembly by deployment of the compression latches, in a similar manner to the procedure discussed above.

Figure 9C:
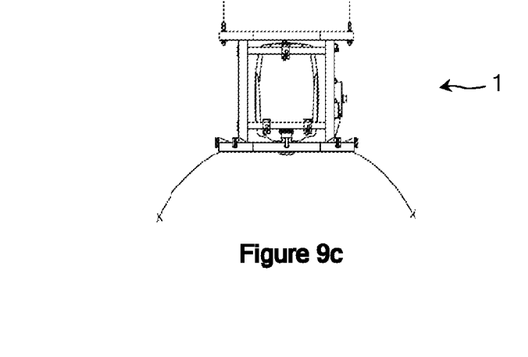
FIG. 9c is a schematic side view of three-dimensional display apparatus assembled in an inverted position.

The three-dimensional display apparatus may then be lifted such that there is sufficient clearance for the screen to be inflated, and the blower activated so as to inflate the screen, as shown in FIG. 9c.

The three-dimensional display apparatus may be disassembled, for storage or transport, by reversing the steps discussed above.

Figure 10:
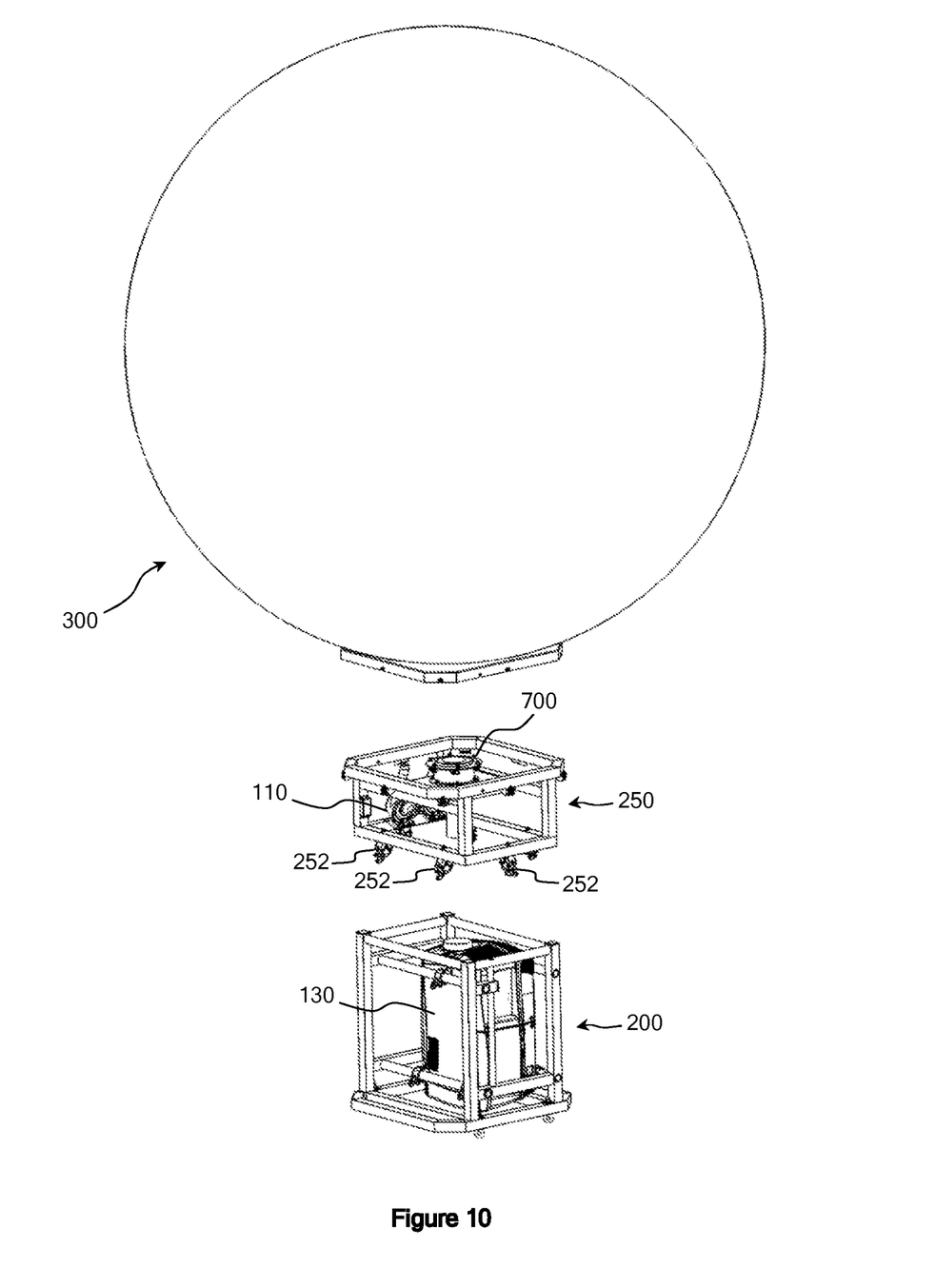
FIG. 10 is a perspective exploded view of an alternative three-dimensional display apparatus.

An alternative, large scale, three-dimensional display apparatus is shown in FIG. 10, comprising a screen unit 300, a first support sub-unit 200, adapted to receive a projector 130, and a second support sub-unit unit 250, adapted to receive the work 110 and a lens assembly 700. In use, the first and second support sub-units may be recently secured together by clamps 252, to provide any large scale support unit. A large-scale support unit which can be disassembled into sub-units, can be advantageously transported in two corresponding flight cases, and a single oversized flight case is therefore not required in order to store or transport the support unit.

The large scale three-dimensional display apparatus shown in the FIG. 10 may be assembled in the same manner as the three-dimensional display apparatus discussed above, with the additional step of securing the first support sub-unit to the second support sub-unit.

Further variations and modifications may be made within the scope of the invention herein disclosed.

The invention claimed is:

1. A method of assembling three-dimensional display apparatus, comprising the steps of:
providing a support unit comprising a projector mounting and a screen mounting surface with a first aperture therethrough;
providing a screen unit, the screen unit comprising a diaphragm and an inflatable screen affixed thereto, the diaphragm defining a second aperture in communication with the interior of the inflatable screen;
bringing the screen mounting surface and the diaphragm into contact so as to align the first aperture with the second aperture; and
securing the support unit to the screen unit to thereby create a seal between the support surface and the diaphragm around the first and second apertures, wherein the seal is sufficiently gas tight to enable inflation of the screen.

2. The method of assembling three-dimensional display apparatus according to claim 1, comprising the step of providing projection apparatus mounted to the projector mounting.

3. The method of assembling three-dimensional display apparatus according to claim 1, comprising the steps of:
providing a first support sub-unit comprising a screen mounting surface and an image guiding assembly extending through a first aperture in the screen mounting surface;
providing a second support sub-unit comprising a projector mounting;
demountably securing the first support sub-unit to the second support sub-unit and thereby providing a support unit;
securing the support unit to the screen unit to thereby create a seal between the support surface and the diaphragm around the first and second apertures, wherein the seal is sufficiently gas tight to enable inflation of the screen.

4. The method of assembling three-dimensional display apparatus according to claim 2, wherein the projection apparatus further comprises an image guiding assembly extending through the first aperture in the screen mounting surface, the method comprising the steps of;
bringing the screen support surface and the diaphragm into contact so as to align the first aperture with the second aperture, so that the image guiding assembly extends through the first and second apertures;
securing the support unit to the screen unit to thereby create a seal between the support surface and the diaphragm around the first and second apertures, wherein the seal is sufficiently gas tight to enable inflation of the screen.

5. The method of assembling three-dimensional display apparatus according to claim 2 comprising the steps of passing an image guiding assembly through the first aperture and securing the image guiding assembly to the support unit.

6. The method of assembling three-dimensional display apparatus according to claim 4, wherein the image guiding assembly comprises a flexible collar having dimensions which exceed the dimensions of the first aperture and the second aperture, the method comprising the steps of:
bringing the screen mounting surface and the diaphragm into contact so as to align the first aperture with the second aperture, so that the image guiding assembly extends through the first and second apertures and the flexible collar extends between the screen mounting surface and the diaphragm; and
securing the screen mounting surface to the diaphragm to thereby create a seal between the support unit and the screen unit, wherein the seal is sufficiently gas tight to enable inflation of the screen when the blower is activated.

7. The method of assembling three-dimensional display apparatus according to claim 6, wherein the flexible collar is provided with magnets and at least some of the screen mounting surface is composed of a ferrous material, the method comprising the step of bringing the magnets into magnetic contact with the screen mounting surface and thereby securing the flexible collar to the screen mounting surface.

8. The method of assembling three-dimensional display apparatus according to claim 1, further comprising the steps of providing a blower affixed to the support unit, the blower having an exhaust conduit extending to a third aperture in the diaphragm.

9. The method of assembling three-dimensional display apparatus according to claim 8 comprising the step of inflating the screen by activating the blower.

10. The method of assembling three-dimensional display apparatus according to claim 1 comprising the steps of:
provulating a screen unit case adapted to enclose the screen unit and support the diaphragm of a screen unit; and
providing a screen unit enclosed within the screen unit case and supported by the diaphragm, such that the inflatable screen extends from the diaphragm within the case.

11. The method of assembling three-dimensional display apparatus according to claim 10 comprising the steps of positioning the screen unit case adjacent to the support unit, inverting the diaphragm and placing it on the support unit, so as to bring the screen mounting surface and the diaphragm into contact.

12. The method of assembling three-dimensional display apparatus according to claim 1, comprising the steps of providing a support unit case containing the support unit, the support unit case comprising a lid releasably secured to one or more side sections, and a base section, the one or more side sections being releasably secured to the base section;
the method comprising the step of removing the lid and the one or more side sections from the base section to expose the support unit, and to thereby provide a support unit.

13. The method of assembling three-dimensional display apparatus according to claim 12, comprising the step of separating the support unit from the base section, to thereby provide a support unit.

14. The method of assembling three-dimensional display apparatus according to claim 10 comprising the steps of:
inverting the support unit, lifting the inverted support unit
positioning the support unit and the screen unit case so that the support unit is above the screen unit supported in the screen unit case; and
bringing the screen mounting surface and the diaphragm into contact by lowering the support unit onto the screen unit.

15. The method of assembling three-dimensional display apparatus according to claim 10 comprising the steps of:
inverting the support unit, lifting the inverted support unit positioning the support unit and the screen unit case so that the support unit is above the screen unit supported in the screen unit case; and
bringing the screen mounting surface and the diaphragm into contact by lifting the screen unit by diaphragm until it meets the support unit.

16. The method of assembling three-dimensional display apparatus according to claim 14, comprising the steps of:
inverting the support unit case so that it rests upon the lid;
removing the base section; and
lifting the inverted support unit.

17. The method of assembling three-dimensional display apparatus according to claim 16, comprising the steps of removing the one or more side sections and lifting the inverted support unit.

18. A method of assembling three-dimensional display apparatus, comprising the steps of:
providing a support unit comprising a projector mounting and a screen mounting surface;
providing a screen unit, the screen unit comprising a screen support and a three-dimensional screen affixed thereto, the screen support defining an aperture in communication with the interior of the screen, and suitable to support the screen in any orientation; and
securing the support unit to the screen unit.

19. The method of assembling three-dimensional display apparatus according to claim 18, comprising the step of providing projection apparatus mounted to the projector mounting, wherein the projection apparatus further comprises an image guiding assembly, the method comprising the step of;
securing the support unit to the screen unit to thereby provide three-dimensional display apparatus wherein the image guiding assembly is aligned with three-dimensional screen.

\* \* \* \* \*